(12) United States Patent
Kim

(10) Patent No.: US 9,733,506 B2
(45) Date of Patent: Aug. 15, 2017

(54) LIQUID CRYSTAL DISPLAY APPARATUS AND DUAL-MONITOR SETTING METHOD

(71) Applicant: SAMSUNG ELECTRONICS CO., LTD., Suwon-si (KR)

(72) Inventor: Sung-woo Kim, Gwangmyeong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 107 days.

(21) Appl. No.: 14/588,689

(22) Filed: Jan. 2, 2015

(65) Prior Publication Data

US 2015/0198831 A1 Jul. 16, 2015

(30) Foreign Application Priority Data

Jan. 14, 2014 (KR) .......................... 10-2014-0004714

(51) Int. Cl.
*G02F 1/1333* (2006.01)
*G06F 3/14* (2006.01)

(52) U.S. Cl.
CPC .... *G02F 1/13336* (2013.01); *G02F 1/133308* (2013.01); *G06F 3/1446* (2013.01); *G02F 2001/13332* (2013.01); *G09G 2300/026* (2013.01); *G09G 2300/0426* (2013.01); *Y10T 29/49002* (2015.01)

(58) Field of Classification Search
CPC .. H05K 7/90; H05K 7/20; G02F 1/133; G02F 1/13336; G06F 3/1446
See application file for complete search history.

(56) References Cited

U.S. PATENT DOCUMENTS

| 7,594,823 | B2* | 9/2009 | Moscovitch | B60R 11/0235 248/121 |
| 8,162,268 | B1* | 4/2012 | Huang | F16M 11/08 248/124.1 |
| 8,369,103 | B2* | 2/2013 | Mitsuhashi | F16M 11/00 248/917 |
| 2002/0135584 | A1* | 9/2002 | Lee | G06F 3/1423 345/531 |
| 2005/0140832 | A1* | 6/2005 | Goldman | H04N 9/3129 348/746 |
| 2008/0232044 | A1* | 9/2008 | Moscovitch | F16M 11/02 361/679.04 |
| 2012/0038742 | A1* | 2/2012 | Robinson | H04N 7/142 348/14.16 |

FOREIGN PATENT DOCUMENTS

| KR | 20-0333169 Y1 | 11/2003 |
| KR | 10-0692677 B1 | 3/2007 |
| KR | 20-2010-0001208 U | 2/2010 |

* cited by examiner

*Primary Examiner* — Ricardo L Osorio
(74) *Attorney, Agent, or Firm* — Sughrue Mion, PLLC

(57) ABSTRACT

A liquid crystal display apparatus includes a housing which is disposed to cover a rear surface of a display device, the housing comprising a top bezel and a bottom bezel which extends to wrap a portion of a top edge and a bottom edge, respectively, of a front surface of the display device, and a side bezel which extends to wrap a portion of a side edge of the display device; and a mounting portion which is disposed on a rear surface of the housing, wherein a black matrix area is exposed in a side surface opposite to one side surface of the display device which is wrapped by the side bezel of the housing.

20 Claims, 24 Drawing Sheets

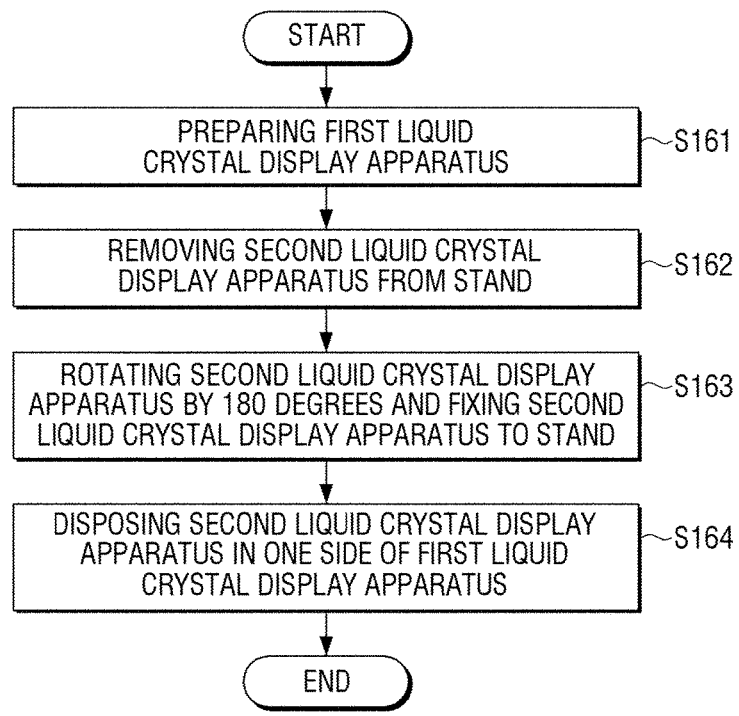

LIQUID CRYSTAL DISPLAY APPARATUS AND DUAL-MONITOR SETTING METHOD

CROSS-REFERENCE TO RELATED APPLICATIONS

This application claims priority from Korean Patent Application No. 10-2014-0004714 filed Jan. 14, 2014 in the Korean Intellectual Property Office, the disclosure of which is incorporated herein by reference in its entirety.

BACKGROUND

1. Field

Exemplary embodiments relate to a liquid crystal display apparatus. In particular, exemplary embodiments relate to a liquid crystal display apparatus which is optimized to be used in a state in which at least two liquid crystal display apparatuses are connected to each other and a dual monitor setting method uses the liquid crystal display apparatuses.

2. Description of the Related Art

In a related art, two monitors are often connected to each other so as to be used as a dual monitor. Further, in the related art, the dual monitor usually comprises liquid crystal display apparatuses.

A dual monitor of the related art is configured so that side surfaces of two normal liquid crystal display apparatuses are in contact with each other. An example is illustrated in FIG. 1 of using two normal liquid crystal display apparatuses as a dual monitor of the related art.

As illustrated in FIG. 1, if normal liquid crystal display apparatuses are used as a dual monitor of the related art, side bezels 101 of two liquid crystal display apparatuses are disposed to contact each other at a contact portion so that an image displayed on the two liquid crystal display apparatuses 100 may give a divided feeling.

Accordingly, when at least two liquid crystal display apparatuses are connected to each other in the related art, a liquid crystal display apparatus may give a feeling that an image displayed on a screen of the liquid crystal display apparatus is divided. However, in the dual monitor of the related art, the divided feeling prevents a user from observing the image displayed as a smooth continuous image across the dual monitor.

SUMMARY

The present disclosure has been developed in order to overcome the above drawbacks and other problems associated with the related art arrangement. An aspect of the exemplary embodiments may provide a liquid crystal display apparatus without one side bezel to minimize a width of a contacting portion when at least two liquid crystal display apparatuses are connected to each other, and a dual monitor setting method using the same.

An aspect of the exemplary embodiments may provide a liquid crystal display apparatus, which may include a housing which is disposed to cover a rear surface of a display device, the housing comprising a top bezel and a bottom bezel which extends to wrap a portion of a top edge and a bottom edge, respectively, of a front surface of the display device, and a side bezel which extends to wrap a portion of a side edge of the display device; and a mounting portion which is disposed on a rear surface of the housing, wherein a black matrix area is exposed in a side surface opposite to one side surface of the display device which is wrapped by the side bezel of the housing.

The mounting portion may be disposed equidistant from the top bezel and bottom bezel.

The mounting portion may include four vesa mount holes.

The housing may include an upper housing and a lower housing, and the upper housing comprises the top bezel, the bottom bezel, and the side bezel which are integrally formed as a single body.

The liquid crystal display apparatus may include a detachable bezel which is detachably disposed in the side surface in which there is no side bezel and opposite to the one side surface of the display device which is wrapped by the side bezel.

The detachable bezel may have a same width as a width of the side bezel.

The detachable bezel may be coupled to the top bezel and the bottom bezel by one touch.

The detachable bezel may be screwed into the housing.

The mounting portion may include a detachable mount or a clip mount.

The side bezel may be detachably disposed in the housing.

The liquid crystal display apparatus may include a controller in which software for setting a configuration of the display device is installed, wherein the software is configured to accept a screen inversion selection for the display device.

The display device may be configured to display an image.

Another aspect of the exemplary embodiments may provide a dual monitor setting method for configuring a dual monitor by using a first liquid crystal display apparatus and a second liquid crystal display apparatus, each of the first liquid crystal display apparatus and the second liquid crystal display apparatus has a circumference of a front surface of a display device which comprises a top bezel, a bottom bezel, a side bezel, and a black matrix area, the dual monitor setting method may include fixing the first liquid crystal display apparatus to a first stand; removing the second liquid crystal display apparatus from a second stand; rotating the second liquid crystal display apparatus by 180 degrees; fixing the second liquid crystal display apparatus, which is rotated by 180 degrees, to the second stand; and disposing the second liquid crystal display apparatus so that a second side surface with a second black matrix area of two side surfaces in the second liquid crystal display apparatus is in contact with a first side surface with a first black matrix area of two side surfaces in the first liquid crystal display apparatus.

The dual monitor setting method may include inverting a screen of the second liquid crystal display apparatus.

If each of the first liquid display apparatus and the second liquid crystal display apparatus comprises a detachable bezel, the dual monitor setting method may include removing the detachable bezel from each of the first liquid display apparatus and the second liquid crystal display apparatus.

A first side surface in the second liquid crystal display apparatus may be disposed at an opposite end of the dual monitor from a second side surface in the first liquid crystal display apparatus.

Another aspect of the exemplary embodiments may provide a liquid crystal display apparatus, which may include: a display device which is configured to display an image; a mounting portion which is disposed on a rear surface of the housing; and a black matrix area which is exposed on one side surface of the display device.

Other objects, advantages, and salient features of the exemplary embodiments will become apparent from the following detailed description, which, taken in conjunction with the annexed drawings, discloses preferred embodiments.

BRIEF DESCRIPTION OF THE DRAWINGS

These and/or other aspects and advantages of the exemplary embodiments will become apparent and more readily appreciated from the following description of the exemplary embodiments, taken in conjunction with the accompanying drawings of which:

FIG. 16 is a flowchart illustrating a dual monitor setting method according to an exemplary embodiment.

Throughout the drawings, like reference numerals will be understood to refer to like parts, components, and structures.

DETAILED DESCRIPTION OF THE EXEMPLARY EMBODIMENTS

Hereinafter, certain exemplary embodiments will be described in detail with reference to the accompanying drawings.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased for assisting in a comprehensive understanding.

Figure 1:
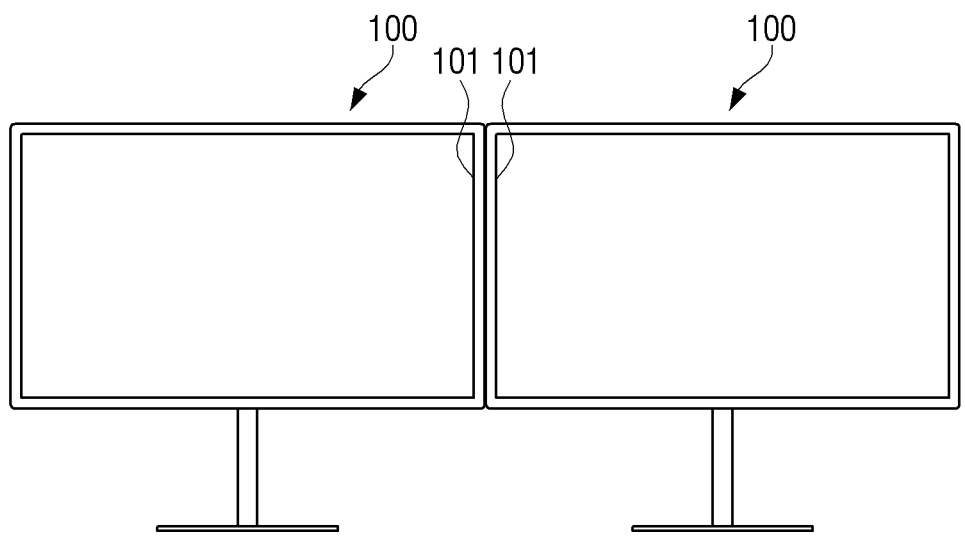
FIG. 1 is a front view illustrating a dual-monitor configured using liquid crystal display apparatuses of the related art.
Figure 2:
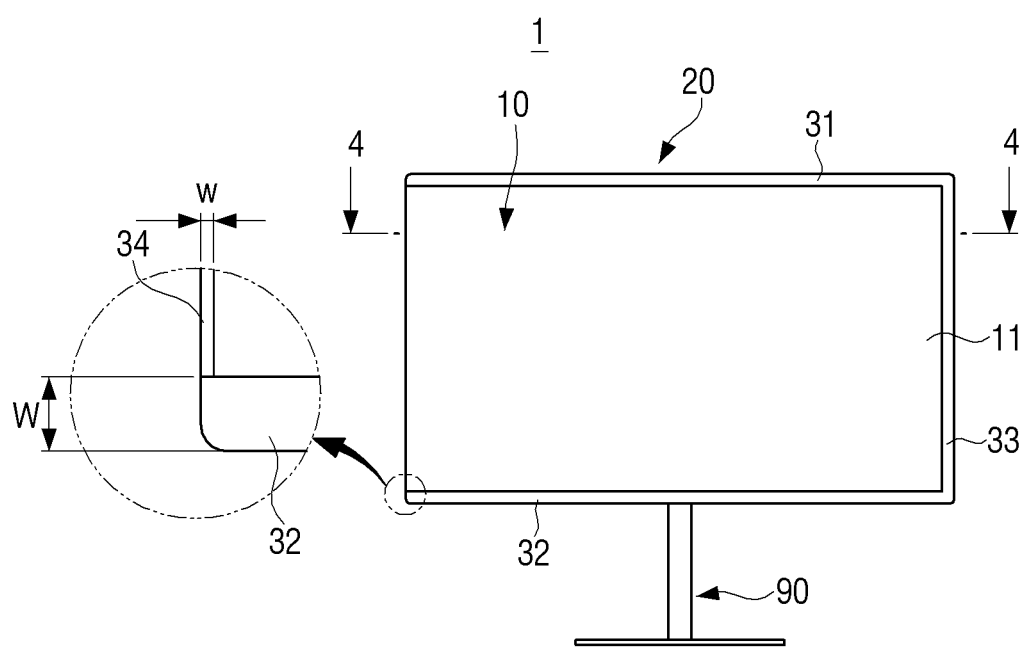
FIG. 2 is a front view illustrating a liquid crystal display apparatus according to an exemplary embodiment.
Figure 3:
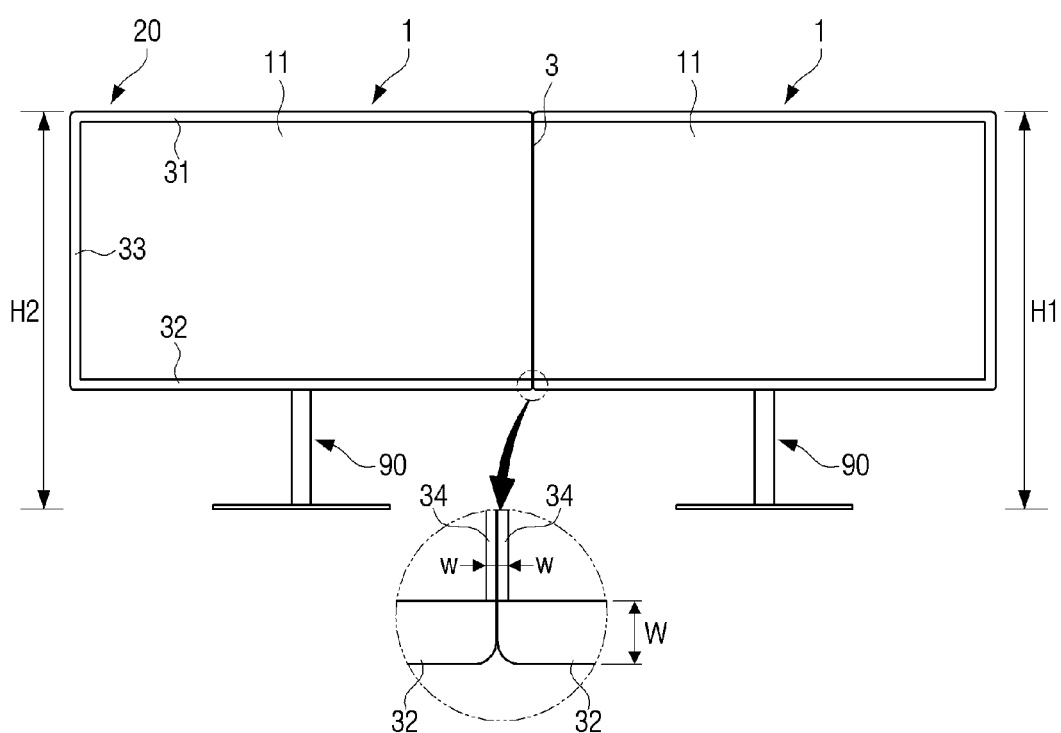
FIG. 3 is a front view illustrating a dual-monitor configured by using two liquid crystal display apparatuses according to an exemplary embodiment.
Figure 4:
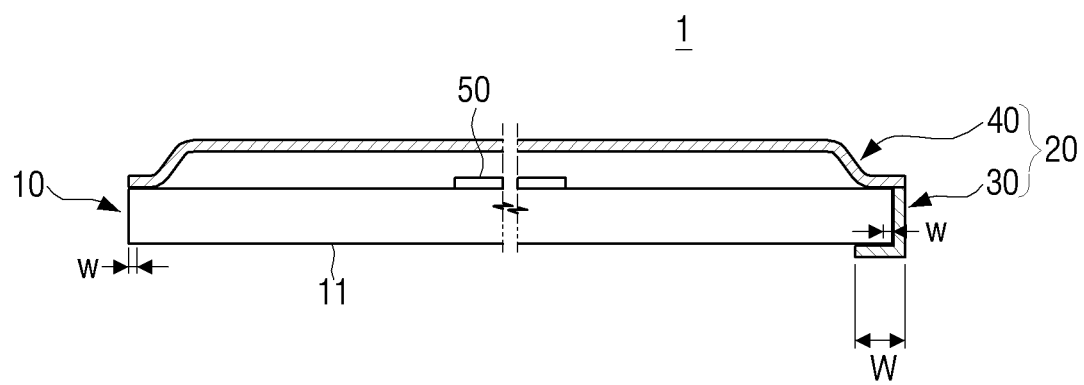
FIG. 4 is a cross-sectional view illustrating the liquid crystal display apparatus of FIG. 2 taken along a line 4-4.
Figure 5:
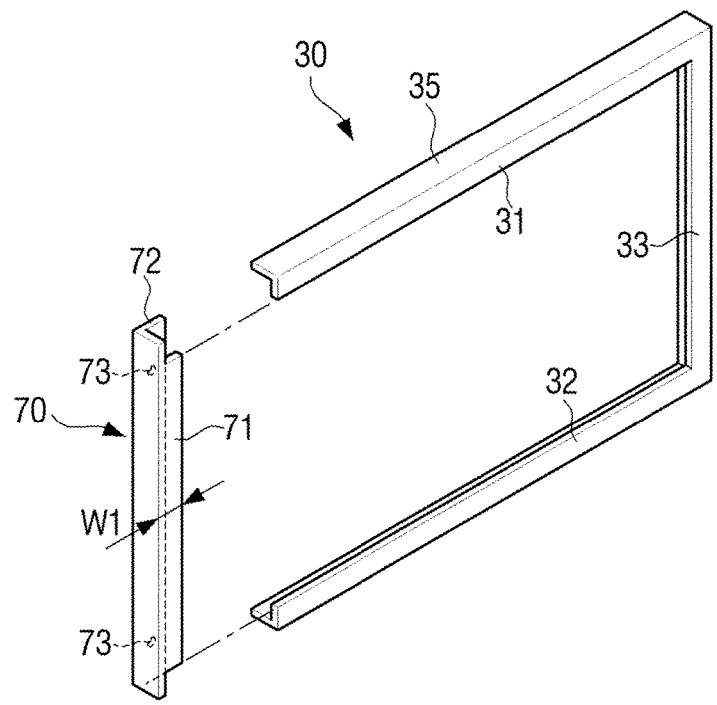
FIG. 5 is a perspective view illustrating an upper housing and a detachable bezel usable with the liquid crystal display apparatus of FIG. 2.
Figure 6A:
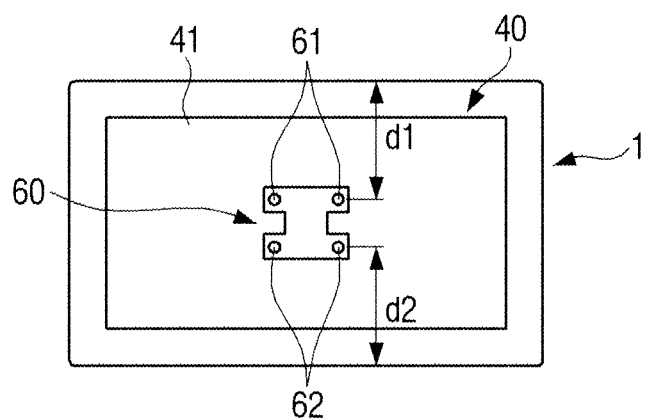
FIG. 6A is a rear view of the liquid crystal display apparatus of FIG. 2.
Figure 6B:
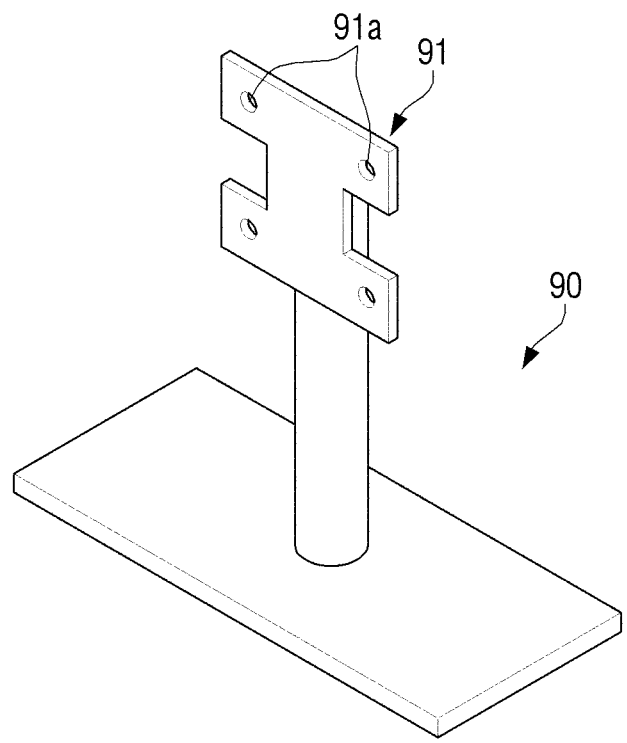
FIG. 6B is a perspective view illustrating a stand to which the liquid crystal display apparatus of FIG. 2 can be fixed.
Figure 7:
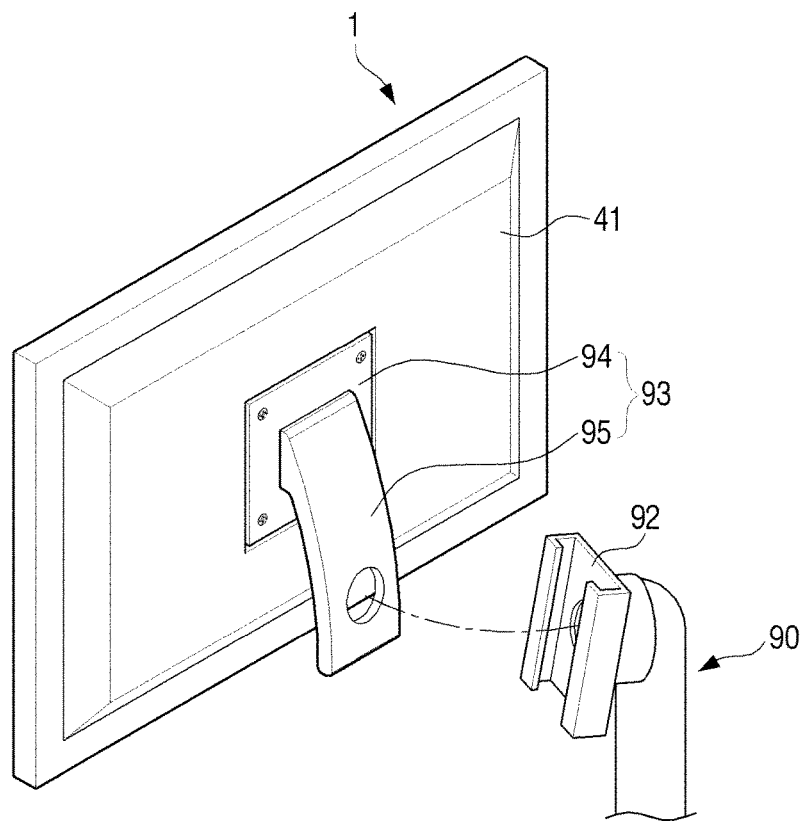
FIG. 7 is a perspective view illustrating a mount structure usable with a liquid crystal display apparatus according to an exemplary embodiment.
Figure 8:
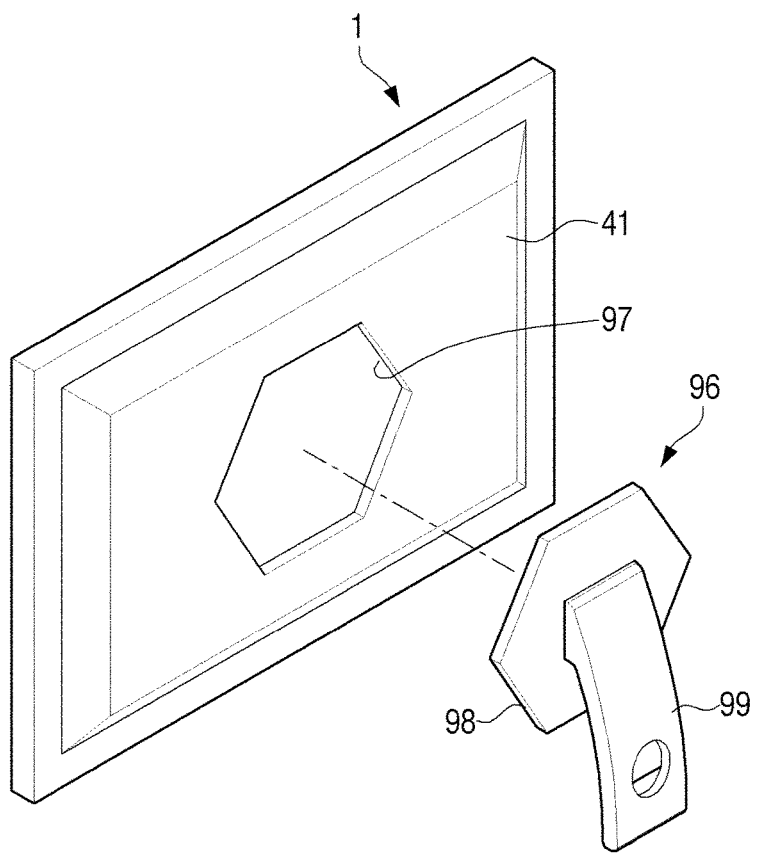
FIG. 8 is a perspective view illustrating another example of a mount structure usable with a liquid crystal display apparatus according to an exemplary embodiment.

FIG. 2 is a front view illustrating a liquid crystal display apparatus according to an exemplary embodiment. FIG. 3 is a front view illustrating a dual monitor configured using two liquid crystal display apparatuses according to an exemplary embodiment. FIG. 4 is a cross-sectional view illustrating the liquid crystal display apparatus of FIG. 2 taken along a line 4-4, and FIG. 5 is a perspective view illustrating an upper housing and a detachable bezel usable with the liquid crystal display apparatus of FIG. 2. FIGS. 6A and 6B are views illustrating a rear surface and a stand of the liquid crystal display apparatus of FIG. 2. FIGS. 7 and 8 are perspective views illustrating a mount structure usable with the liquid crystal display apparatus FIG. 2.

Referring to FIGS. 2 through 5, the liquid crystal display apparatus 1 according to an exemplary embodiment includes a display unit 10 and a housing 20.

The display unit 10 is configured to display images and includes a liquid crystal display panel (not illustrated) and a backlight unit (not illustrated).

The backlight unit may use a direct-type backlight unit in which a plurality of light sources is disposed directly below the liquid crystal display panel. Alternatively, the backlight unit may use an edge-type backlight unit in which a plurality of light sources is disposed in a side of the liquid crystal display panel. When the edge-type backlight unit is used, the plurality of light sources may be disposed in only one side surface of the liquid crystal display panel in which a side bezel 33 is provided, and may not be disposed in the other side surface of the liquid crystal display panel in which the side bezel 33 is not provided. As another example, the plurality of light sources may be disposed in top and bottom side surfaces of the liquid crystal display panel.

A controller 50 configured to control the liquid crystal display panel and the backlight unit may be disposed in a rear surface of the backlight unit. Software for setting configuration of the display unit 10 may be installed in a memory (not illustrated) of the controller 50. Also, the configuration software may be capable of selecting a screen inversion of the display unit 10. In other words, when rotating the liquid crystal display apparatus 1 by 180 degrees, a user executes the configuration software and selects the screen inversion so that the liquid crystal display apparatus 1 rotated by 180 degrees can display images in the same way as a non-rotated installed liquid crystal display apparatus 1.

Detailed description of the liquid crystal display panel and backlight unit of the display unit 10 is omitted.

A black matrix area 34 is formed in an entire circumference of a front surface of the display unit 10, i.e., in a top edge, a bottom edge, a left edge, and a right edge of the front surface of the display unit 10. The black matrix area 34 is formed for shading the liquid crystal display panel and its width is about 1.5 mm.

The housing 20 is formed to support and secure the display unit 10 with sufficient strength. The housing 20 may include an upper housing 30 and a lower housing 40. The upper housing 30 is coupled to the lower housing 40. The lower housing 40 is formed to cover the entire rear surface of the display unit 10, and has rigidity to stably support the display unit 10.

The upper housing 30 is formed in a substantially flat U-shape to be able to cover three edges of the front surface 11 of the display unit 10. As illustrated in FIG. 5, the upper housing 30 includes an upper housing body 35 formed in a substantially flat U-shape, a top bezel 31 that extends perpendicularly from the upper housing body 35 and wraps a top edge of the front surface 11 of the display unit 10, a bottom bezel 32 that extends perpendicularly from the upper housing body 35 and wraps a bottom edge of the front surface 11 of the display unit 10, and a side bezel 33 that extends perpendicularly from the upper housing body 35 and wraps one side edge of the front surface 11 of the display unit 10. Accordingly, the upper housing body 35, the top bezel 31, the bottom bezel 32, and the side bezel 33 configured of the upper housing 30 is formed in a single body.

When the upper housing 30 is connected to the lower housing 40, a portion of the black matrix area 34 formed in the circumference of the front surface 11 of the display unit 10 is exposed in the other side surface of the display unit 10 which is opposite to the one side surface of the display unit 10 wrapped by the side bezel 33, i.e., in a side surface of the display unit 10 in which a side bezel 33 is not disposed. Thus, the liquid crystal display apparatus 1 may be implemented to have sufficient mechanical strength by supporting three sides of the display unit 10 by the upper housing 30 and the lower housing 40.

The top bezel 31, bottom bezel 32, and side bezel 33 may be formed to cover the black matrix area 34 and support the display unit 10 with sufficient rigidity. For example, if a width w of the black matrix area 34 is about 1.5 mm, each of the top bezel 31, bottom bezel 32, and side bezel 33 may have a width W of about 4 mm-5 mm.

A mounting portion 60 is formed in the rear surface 41 of the housing 20 as illustrated in FIG. 6A, and allows the liquid crystal display apparatus 1 to be detachably fixed to a stand 90. The mounting portion 60 is formed in the housing 20 so that, even when the liquid crystal display apparatus 1 is rotated by 180 degrees, a height from a base surface in which the stand 90 is disposed to a top end of the liquid crystal display apparatus 1 is the same as a height when the liquid crystal display apparatus 1 is not rotated by 180 degrees. Further, the mounting portion 60 is provided in the rear surface 41 of the housing 20 so that the height H1 (see FIG. 3) from the base surface to the top end of the liquid crystal display apparatus 1, when the liquid crystal display apparatus 1 is fixed to the stand 90 in a non-rotated state, is the same as the height H2 (see FIG. 3) from the base surface to the top end of the liquid crystal display apparatus 1, when the liquid crystal display apparatus 1 is rotated by 180 degrees and fixed to the stand 90. Therefore, the mounting portion 60 is formed at the same distance from each of the top end and the bottom end of the liquid crystal display apparatus 1. In other words, the mounting portion 60 may be disposed at the same distance from the top bezel 31 and the bottom bezel 32. For example, as illustrated in FIG. 6A, if the mounting portion 60 is implemented as four vesa mount holes 61 and 62, the distance d1 from the top end of the liquid crystal display apparatus 1 to the upper vesa mount holes 61 is formed to be the same as the distance d2 from the bottom end of the liquid crystal display apparatus 1 to the lower vesa mount holes 62.

As illustrated in FIG. 6B, if the mounting portion 60 is implemented as the vesa mount holes 61 and 62, the stand 90 is provided with a vesa mount 91 having mount holes 91a corresponding to the vesa mount holes 61 and 62.

Alternatively, the mounting portion 60 may be implemented as a detachable mount 93 or a clip mount 96.

Examples of a liquid crystal display apparatus 1 in which the detachable mount 93 is disposed and a stand 90 to which the detachable mount 93 is able to be fixed are illustrated in FIG. 7. Referring to FIG. 7, the detachable mount 93 includes a fixing bracket 94 which is secured to the rear surface 41 of the housing 20 of the liquid crystal display apparatus 1, and a fixing hook 95 extending from the fixing bracket 94. The fixing bracket 94 is screwed into the rear surface 41 of the housing 20. For example, the fixing bracket 94 may be fixed to the rear surface 41 of the housing 20 using the vesa mount holes 61 and 62 described above. The stand 90 is provided with a hook coupling portion 92 to which the fixing hook 95 can be coupled. Accordingly, if the fixing hook 95 of the detachable mount 93 disposed in the liquid crystal display apparatus 1 is coupled to the hook coupling portion 92 of the stand 90, the liquid crystal display apparatus 1 is fixed to the stand 90.

If a user wants to turn the liquid crystal display apparatus 1 by 180 degrees, the user may remove the fixing bracket 94 from the rear surface 41 of the liquid crystal display apparatus 1. Then, the user turns the liquid crystal display apparatus 1 by 180 degrees, and fixes the fixing bracket 94 to the rear surface 41 of the housing 20. Subsequently, the user couples the fixing hook 95 of the liquid crystal display apparatus 1 to the hook coupling portion 92 of the stand 90 so that the liquid crystal display apparatus 1 is rotated by 180 degrees. At this time, since the fixing bracket 94 is disposed at the same distance from each of the top end and the bottom end of the liquid crystal display apparatus 1, even when the liquid crystal display apparatus 1 is rotated by 180 degrees, the height H2 (see FIG. 3) from the base surface to the top end of the liquid crystal display apparatus 1 is the same as the height H1 (see FIG. 3) of the liquid crystal display apparatus 1 which is not rotated by 180 degrees.

An example of a clip mount 96 and a liquid crystal display apparatus 1 in which the clip mount 96 can be disposed are illustrated in FIG. 8. As illustrated in FIG. 8, a clip groove 97 is provided in the rear surface 41 of the housing 20 of the liquid crystal display apparatus 1. The clip mount 96 includes a clip portion 98 which is inserted into and coupled to the clip groove 97 of the rear surface 41 of the housing 20, and a fixing hook 99 extending from the clip portion 98. The clip portion 98 and the clip groove 97 have the same cross-section. Therefore, the clip portion 98 and the clip groove 97 are formed to be coupled to each other when the liquid crystal display apparatus 1 is not rotated and when the liquid crystal display apparatus 1 is rotated by 180 degrees.

For example, a cross-section of each of the clip portion 98 and the clip groove 97 may be formed as one of a plurality of shapes such as a square, a rectangular, a hexagon, an octagon, etc. At this time, the clip groove 97 is formed at the same distance from each of the top end and the bottom end of the liquid crystal display apparatus 1. The fixing hook 99 may be formed in the same shape as the fixing hook 95 of the detachable mount 93 described above. Accordingly, the clip mount 96 may be mounted to the hook coupling portion 92 of the stand 90 as illustrated in FIG. 7. As a result, if the clip mount 96 as described above is used, the liquid crystal display apparatus 1 rotated by 180 degrees may be fixed to the stand 90. Even if the liquid crystal display apparatus 1 is rotated by 180 degrees, the height H2 (see FIG. 3) from the base surface to the top end of the liquid crystal display apparatus 1 is the same as the height H1 (see FIG. 3) of the liquid crystal display apparatus 1 that is not rotated by 180 degrees.

Further, as another example, the mounting portion 60 of the liquid crystal display apparatus 1 may be fixed to a pivot stand (not illustrated) that can rotate by 180 degrees. In this case, the liquid crystal display apparatus 1 can be rotated by 180 degrees without removing the liquid crystal display apparatus 1 from the pivot stand. Detailed description of the pivot stand is omitted.

In another exemplary embodiment, a detachable bezel 70 may be detachably disposed in the side surface of the display unit 10 in which the side bezel 33 of the liquid crystal display apparatus 1 does not exist. Hereinafter, a liquid crystal display apparatus 1 according to an exemplary embodiment including the detachable bezel 70 will be described in detail with reference to FIGS. 9A through 11C.

Figure 9A:
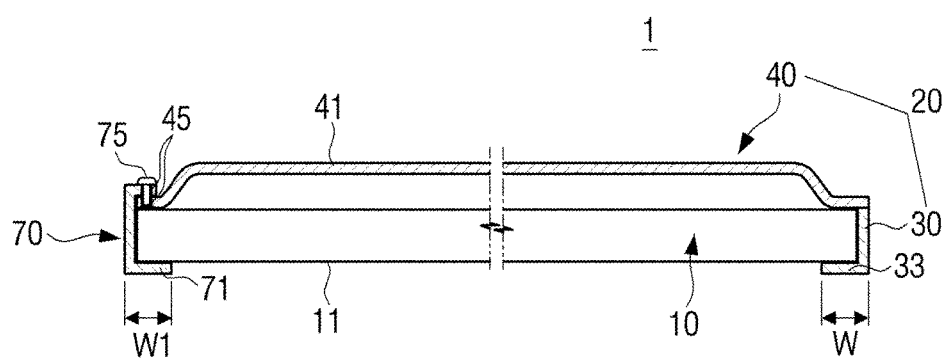
FIG. 9A is a cross-sectional view illustrating the liquid crystal display apparatus of FIG. 2 to which a detachable bezel is coupled.
Figure 9B:
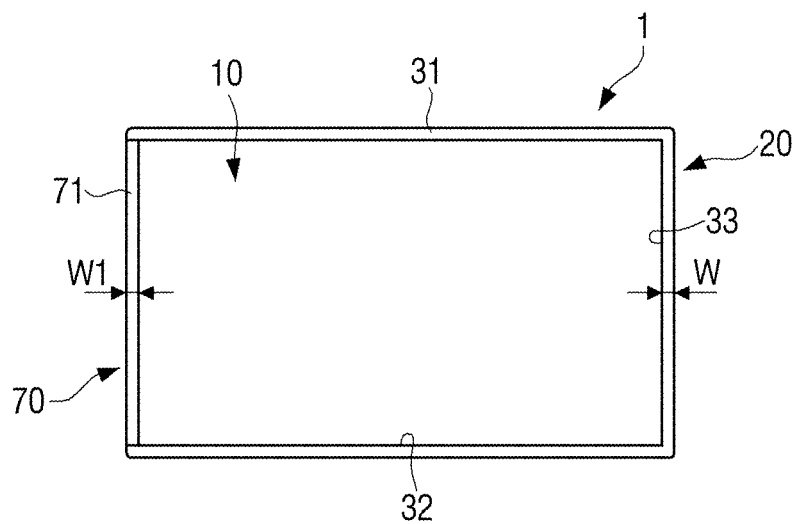
FIG. 9B is a front view of the liquid crystal display apparatus of FIG. 9A.
Figure 10A:
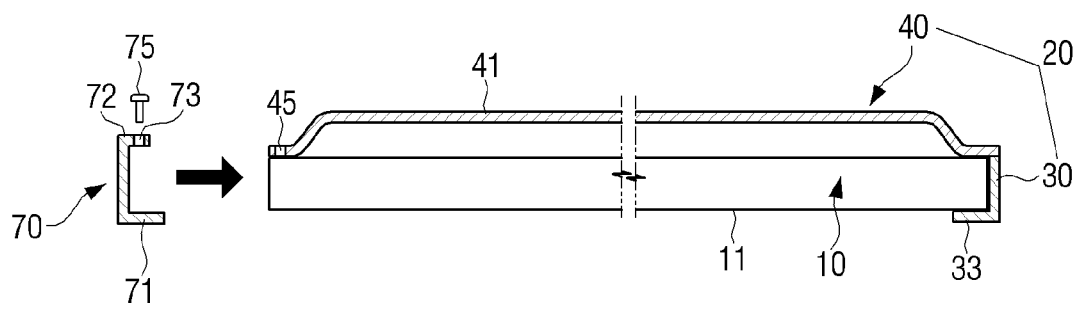
FIG. 10A is a cross-sectional view illustrating a state in which the detachable bezel is separated from the liquid crystal display apparatus of FIG. 9A.
Figure 10B:
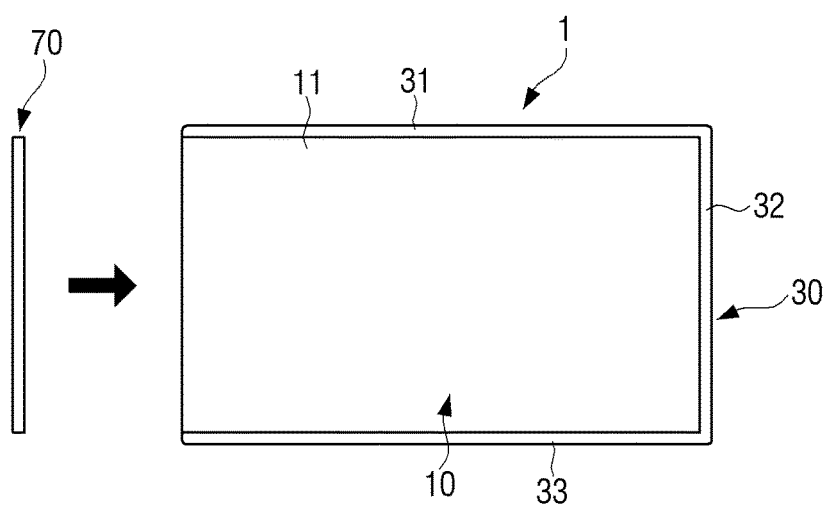
FIG. 10B is a front view of the liquid crystal display apparatus of FIG. 10A.
Figure 11A:
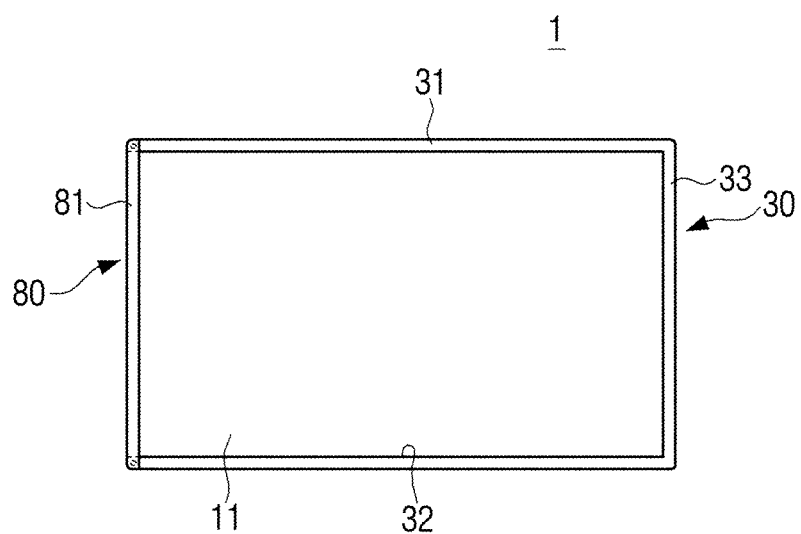
FIG. 11A is a front view illustrating a liquid crystal display apparatus according to another exemplary embodiment.

FIG. 9A is a cross-sectional view illustrating the liquid crystal display apparatus of FIG. 2 to which a detachable bezel is coupled, and FIG. 9B is a front view of the liquid crystal display apparatus of FIG. 9A. FIG. 10A is a cross-sectional view illustrating a state in which a detachable bezel is separated from the liquid crystal display apparatus of FIG. 9A, and FIG. 10B is a front view of the liquid crystal display apparatus of FIG. 10A. FIG. 11A is a front view illustrating a liquid crystal display apparatus according to another exemplary embodiment, FIG. 11B is a plan view of the liquid crystal display apparatus of FIG. 11A, and FIG. 11C is a view illustrating a state in which a detachable bezel is separated from the liquid crystal display apparatus of FIG. 11A.

As illustrated in FIGS. 9A and 9B, the detachable bezel 70 is detachably disposed in one side surface of the liquid crystal display apparatus 1 according to an exemplary embodiment in which there is no side bezel 33. Accordingly, if the detachable bezel 70 is disposed as illustrated in FIG. 9B, the liquid crystal display apparatus 1 according to an exemplary embodiment has an appearance similar to related art liquid crystal display apparatuses having bezels in four side surfaces thereof.

If the liquid crystal display apparatuses 1 are desired to be used as a dual monitor, as illustrated in FIGS. 10A and 10B, the detachable bezel 70 is removed from the liquid crystal display apparatus 1. At this time, if a plurality of screws 75 is loosened from the rear surface 41 of the housing 20, the detachable bezel 70 may be removed from the liquid crystal display apparatus 1. One example of the removed detachable bezel 70 is illustrated in FIG. 5. Referring to FIG. 5, the detachable bezel 70 is formed in a substantially flat U shape, an upper arm 71 is formed to have a length corresponding to a distance D (as shown in FIG. 11C) between the top bezel 31 and the bottom bezel 32 so as to form a side bezel, and a lower arm 72 is provided with a plurality of screw holes 73. A plurality of taps 45 is formed in positions corresponding to the plurality of screw holes 73 of the detachable bezel 70 in the lower housing 40. Accordingly, if the detachable bezel 70 is mounted to the one side surface of the liquid crystal display apparatus 1 in which there is no side bezel 33 and a plurality of screws 75 is screwed into the plurality of taps of the lower housing 40 via the plurality of screw holes 73 of the detachable bezel 70, the detachable bezel 70 is fixed to the lower housing 40 as illustrated in FIGS. 9A and 9B. At this time, the width W1 of the detachable bezel 70 is formed to be the same as the width W of the side bezel 33 of the upper housing 30.

Figure 11B:
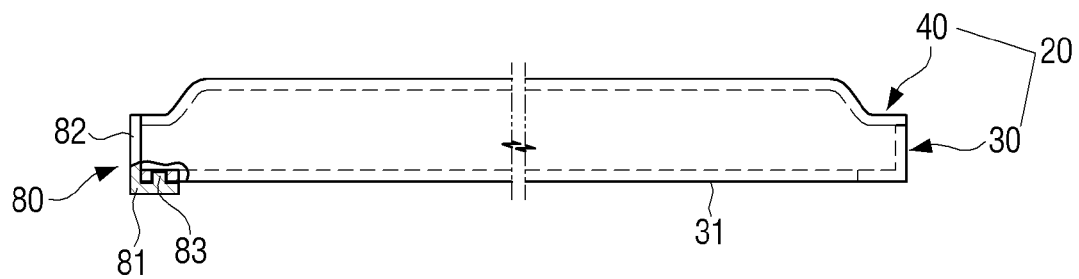
FIG. 11B is a plan view of the liquid crystal display apparatus of FIG. 11A.
Figure 11C:
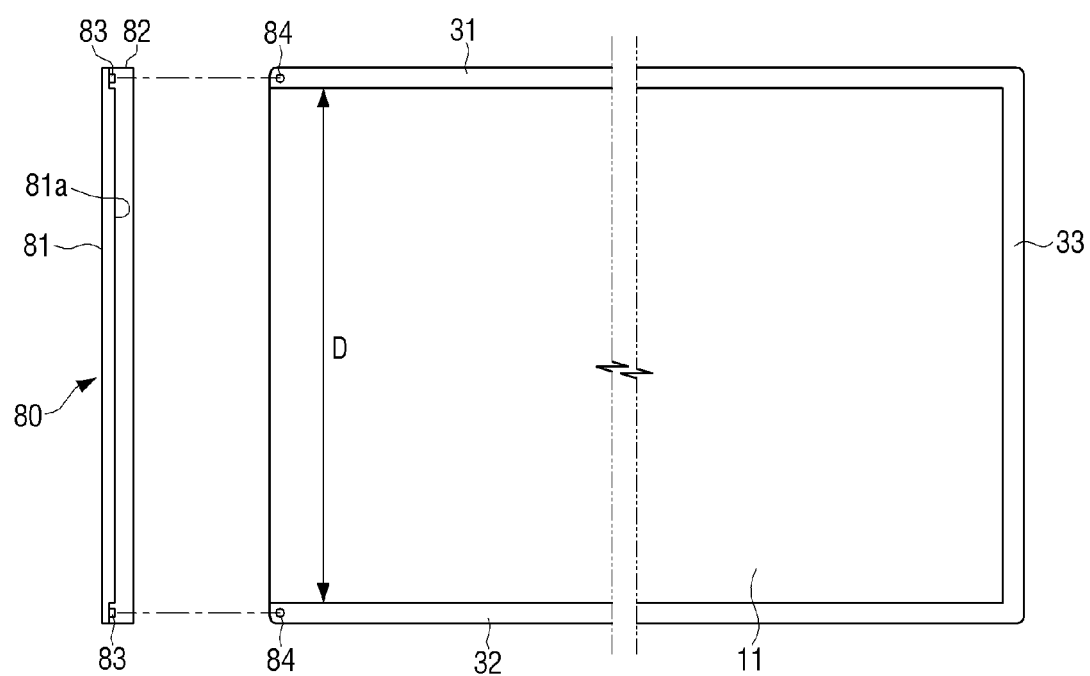
FIG. 11C is a view illustrating a state in which a detachable bezel is separated from the liquid crystal display apparatus of FIG. 11A.

FIGS. 11A through 11C illustrate another example of a detachable bezel 80. If the detachable bezel 80 is disposed in a side surface of the liquid crystal display apparatus 1 in which there is no bezel, as illustrated in FIG. 11A, the bezels 31, 32, 33 and 81 exist in the circumference of the front surface 11 of the liquid crystal display apparatus 1.

If a user desires to use the liquid crystal display apparatus 1 according to an exemplary embodiment as a dual monitor, the user removes the detachable bezel 80 from the liquid crystal display apparatus 1. At this time, since the detachable bezel 80 is coupled to the top bezel 31 and the bottom bezel 32 by one touch, the detachable bezel 80 may be easily removed from the liquid crystal display apparatus 1 by a user.

The liquid crystal display apparatus 1 from which the detachable bezel 80 is removed is illustrated in FIG. 11C. Referring to FIG. 11C, the detachable bezel 80 is formed in a substantially L shape, and two fixing protrusions 83 are provided in a side plate 81 forming the bezel. A projecting portion 81a having a length corresponding to the distance D between the top bezel 31 and the bottom bezel 32 and a height corresponding to the thickness of each of the top bezel 31 and the bottom bezel 32 is provided between the two fixing protrusions 83. Also, a fixing hole 84 is provided in an end portion of each of the top bezel 31 and the bottom bezel 32 of the liquid crystal display apparatus 1. At this time, the fixing protrusions 83 formed in the detachable bezel 70 and the fixing holes 84 provided in the top and bottom bezels 31 and 32 are formed to be coupled to or to be separated from each other with one touch by a user. Accordingly, if the two fixing protrusions 83 are inserted into the fixing hole 84 of the top bezel 31 and the fixing hole 84 of the bottom bezel 32 as illustrated in FIG. 11B, the detachable bezel 70 is fixed to the liquid crystal display apparatus 1 as illustrated in FIG. 11A.

Figure 15:
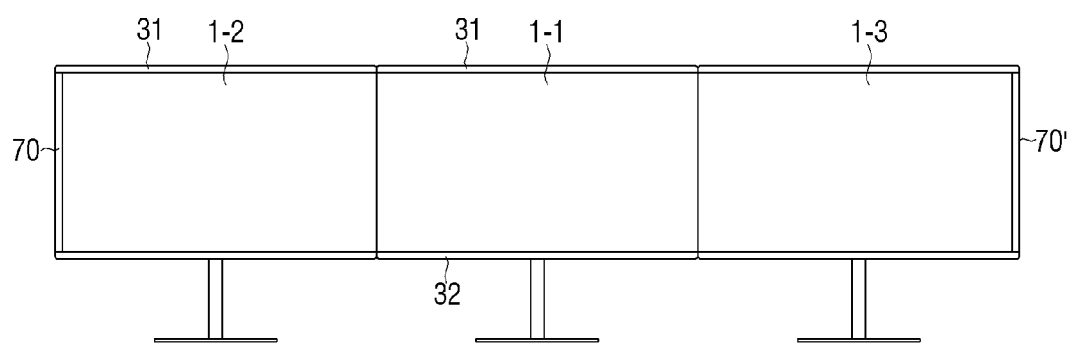
FIG. 15 is a view illustrating a triple monitor configured by using liquid crystal display apparatuses according to an exemplary embodiment.

In another exemplary embodiment, both side bezels of the liquid crystal display apparatus 1 may be formed as detachable bezels. If both side bezels of the liquid crystal display apparatus 1 are each formed as the detachable bezel, when three or more liquid crystal display apparatuses 1 are disposed side by side as illustrated in FIG. 15, the width of the contacting portion between the three or more liquid crystal display apparatuses 1 may be minimized.

The liquid crystal display apparatus 1 having detachable bezels in both side surfaces will be described in detail with reference to FIGS. 12A through 14B.

Figure 12A:
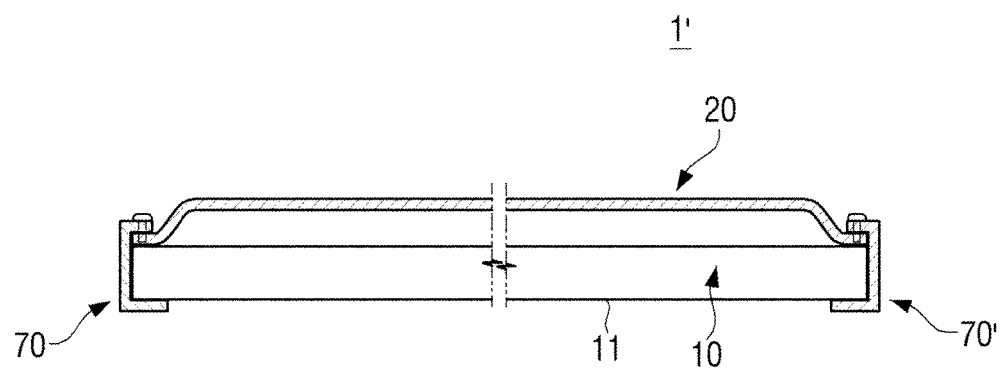
FIG. 12A is a cross-sectional view illustrating a liquid crystal display apparatus with two detachable bezels disposed in both side surfaces thereof according to another exemplary embodiment.
Figure 12B:
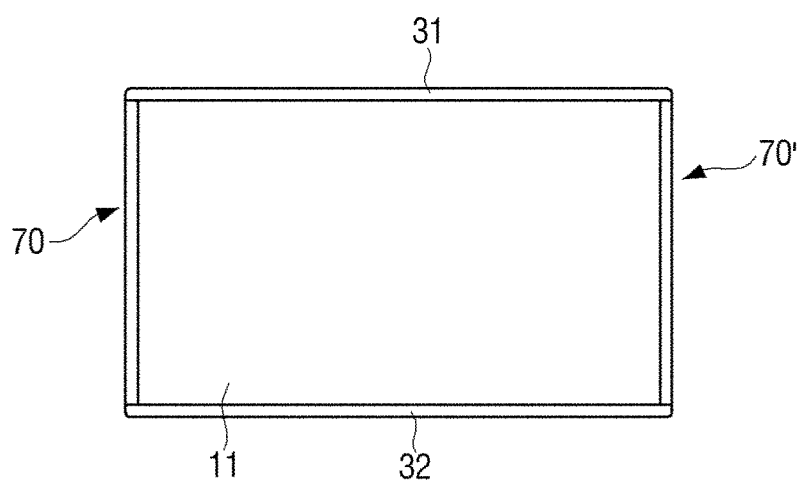
FIG. 12B is a front view of the liquid crystal display apparatus of FIG. 12A.

FIG. 12A is a cross-sectional view illustrating a liquid crystal display apparatus with two detachable bezels disposed in both side surfaces thereof according to another exemplary embodiment, and FIG. 12B is a front view of the liquid crystal display apparatus of FIG. 12A.

When a single liquid crystal display apparatus 1 is used, as illustrated in FIGS. 12A and 12B, the liquid crystal display apparatus 1 is used in a state in which two detachable bezels 70 and 70' are coupled to the both side surfaces of the liquid crystal display apparatus 1. At this time, the detachable bezels 70 and 70' may use bezels having a structure identical or similar to the detachable bezel 70 as illustrated in FIG. 6.

Figure 13A:
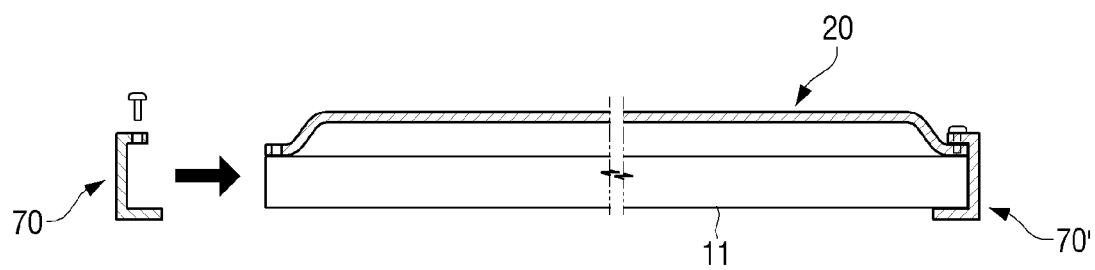
FIG. 13A is a cross-sectional view illustrating a state in which a detachable bezel is removed from one side surface of the liquid crystal display apparatus of FIG. 12A.

In this state, if two liquid crystal display apparatuses 1 are desired to be connected to each other in order to use as a dual monitor, one detachable bezel 70 is removed from one side surface of the liquid crystal display apparatus 1. FIG. 13A is a cross-sectional view illustrating a state in which the detachable bezel 70 is separated from one side surface of the liquid crystal display apparatus 1 of FIG. 12A, and FIG. 13B is a front view of the liquid crystal display apparatus 1 of FIG. 13A.

Figure 13B:
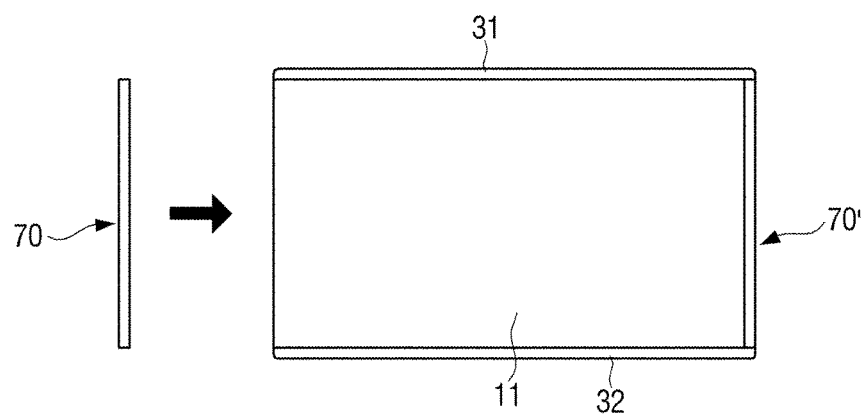
FIG. 13B is a front view of the liquid crystal display apparatus of FIG. 13A.

As illustrated in FIGS. 13A and 13B, the liquid crystal display apparatus 1 from which the one side detachable bezel 70 is removed is the same as the liquid crystal display apparatus 1 having no side bezel at one side of the liquid display apparatus (as described above with reference to FIGS. 2 and 4). Accordingly, one liquid crystal display apparatus 1 remains in a non-rotated state, and the other liquid crystal display apparatus 1 is rotated by 180 degrees. One side surface of the other liquid crystal display apparatus 1 in which there is not a side bezel may be disposed to be in contact with the side surface of the one liquid crystal display apparatus 1 in which there is not a side bezel, thereby configuring a dual monitor (as illustrated in FIG. 3).

Figure 14A:
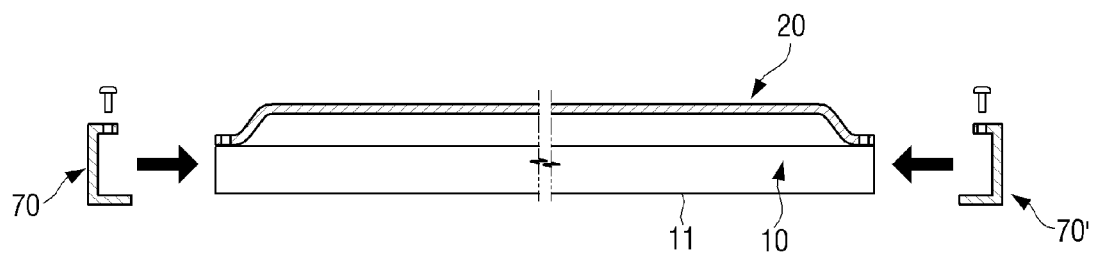
FIG. 14A is a cross-sectional view illustrating a state in which the two detachable bezels are removed from both side surfaces of the liquid crystal display apparatus of FIG. 12A.
Figure 14B:
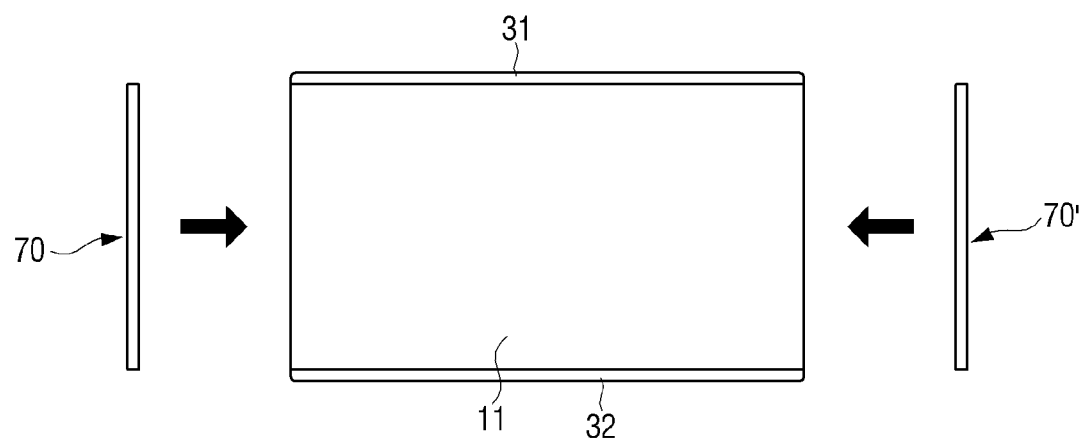
FIG. 14B is a front view of the liquid crystal display apparatus of FIG. 14A.

In a case in which a triple monitor is configured using three liquid crystal display apparatuses 1-1, 1-2, and 1-3, two detachable bezels 70 and 70' are removed from both side surfaces of a first liquid crystal display apparatus 1-1, a detachable bezel 70' is removed from the right side surface of a second liquid crystal display apparatus 1-2, and a detachable bezel 70 is removed from the left side surface of a third liquid crystal display apparatus 1-3. FIG. 14A is a cross-sectional view illustrating a state in which detachable bezels are separated from both side surfaces of the liquid crystal display apparatus of FIG. 12A, and FIG. 14B is a front view of the liquid crystal display apparatus of FIG. 14A.

When both detachable bezels 70 and 70' are removed from both side surfaces of the first liquid crystal display apparatus 1-1, only the top bezel 31 and the bottom bezel 32 exist in the first liquid crystal display apparatus 1-1. In this state, the second liquid crystal display apparatus 1-2, from which the right detachable bezel 70' is removed, is connected to the left side surface of the first liquid crystal display apparatus 1-1 from which both sides detachable bezels 70 and 70' are removed with a non-rotated state. After that, the third liquid crystal display apparatus 1-3, from which the left detachable bezel 70 is removed, is connected to the right side surface of the first liquid crystal display apparatus 1-1 from which both sides detachable bezels 70 and 70' are removed with a non-rotated state. As a result, a triple monitor is configured so that three liquid crystal display apparatuses 1-1, 1-2 and 1-3 are connected to and in contact with each other as illustrated in FIG. 15. As described above, if both side bezels 33 are formed in the detachable bezels 70 and 70', the liquid crystal display apparatus 1 is not required to be rotated by 180 degrees in order to form a dual monitor configuration or a triple monitor configuration.

Hereinafter, a method for setting a dual-monitor using two liquid crystal display apparatuses 1 according to an exemplary embodiment will be described in detail with reference to FIG. 16.

FIG. 16 is a flowchart illustrating a dual monitor setting method according to an exemplary embodiment.

First, two liquid crystal display apparatuses, i.e., a first liquid crystal display apparatus and a second liquid crystal display apparatus are provided (S161). At this time, each of the first and second liquid crystal display apparatuses is formed so that the circumference of a front surface of a display unit is configured with a top bezel, a bottom bezel, a side bezel, and a black matrix area.

The first liquid crystal display apparatus remains coupled to a stand in a non-rotated state. The non-rotated state refers to a state in which the liquid crystal display apparatus is not rotated by 180 degrees. If the first liquid crystal display apparatus includes a detachable bezel, the detachable bezel is removed from the first liquid crystal display apparatus so as to expose the black matrix area.

Then, the second liquid crystal display apparatus is removed from the stand (S162). At this time, the second liquid crystal display apparatus may be removed from the stand using a mounting portion provided in a rear surface of the second liquid crystal display apparatus.

After that, a user rotates the second liquid crystal display apparatus by 180 degrees, and then fixes the second liquid crystal display apparatus, which is rotated by 180 degrees, to the stand (S163). At this time, since the mounting portion of the second liquid crystal display apparatus is located at the same distance from each of the top end and the bottom end of the second liquid crystal display apparatus, even when the second liquid crystal display apparatus is fixed to the stand in a state rotated by 180 degrees, the height from the base surface to the top end of the second liquid crystal display apparatus is the same as the height of the first liquid crystal display apparatus which is not rotated by 180 degrees. If the second liquid crystal display apparatus includes a detachable bezel, the detachable bezel is removed from the second liquid crystal display apparatus so as to expose the black matrix area.

Next, the second liquid crystal display apparatus is disposed at a side of the first liquid crystal display apparatus (S164). Further, the second liquid crystal display apparatus is disposed so that the side surface of the second liquid crystal display apparatus rotated by 180 degrees in which the side bezel does not exist, i.e., in which the black matrix area exists is in contact with the side surface of the first liquid crystal display apparatus in which the side bezel does not exist, i.e., in which the black matrix area exists. Then, installation of a dual monitor occurs so that the width of a contacting portion of two liquid crystal display apparatuses is twice the width w of the black matrix area as illustrated in FIG. 3.

Then, the user runs configuration software of the second liquid crystal display apparatus, which is rotated by 180 degrees, so as to invert the screen of the second liquid crystal display apparatus. Detailed description of the configuration software for inverting the screen of the second liquid crystal display apparatus is omitted.

If the dual monitor is configured using the liquid crystal display apparatuses according to an exemplary embodiment, the width of a contacting portion in which two liquid crystal display apparatuses are in contact with each other may be minimized to twice the width of the black matrix area. Accordingly, images being displayed on the dual-monitor configured of two liquid crystal display apparatuses according to an exemplary embodiment may give a feeling of a more smooth continuous image than an image being displayed on a related art dual monitor.

While the exemplary embodiments have been described, additional variations and modifications of the exemplary embodiments may occur to those skilled in the art once they learn the basic inventive concepts. Therefore, it is intended that the appended claims shall be construed to include both the above embodiments and all such variations and modifications that fall within the spirit and scope of the inventive concepts.

What is claimed is:

1. A display apparatus comprising:
   a housing which is disposed to cover a rear surface of a display device, the housing comprising a top bezel and a bottom bezel which extends to wrap a black matrix area of a top edge and a bottom edge, respectively, of a front surface of the display device, and a side bezel which extends to wrap a portion of the black matrix area of a side edge of the front surface of the display device; and
   a mounting portion which is disposed on a rear surface of the housing,
   wherein another portion of the black matrix area is exposed in a side surface opposite to one side surface of the display device which is wrapped by the side bezel of the housing and
   wherein the top bezel, the bottom bezel, and the side bezel of the housing are integrally formed as a single body.

2. The display apparatus as claimed in the claim 1, wherein
   the mounting portion is disposed equidistant from the top bezel and the bottom bezel.

3. The display apparatus as claimed in the claim 2, wherein
   the mounting portion comprises four vesa mount holes.

4. The display apparatus as claimed in the claim 1, wherein
   the housing comprises an upper housing and a lower housing, and
   the upper housing comprises the top bezel, the bottom bezel, and the side bezel.

5. The display apparatus as claimed in the claim 1, further comprising:
   a detachable bezel which is detachably disposed in the side surface in which there is no side bezel and opposite to the one side surface of the display device which is wrapped by the side bezel.

6. The display apparatus as claimed in the claim 5, wherein
   the detachable bezel has a same width as a width of the side bezel.

7. The display apparatus as claimed in the claim 5, wherein
   the detachable bezel is coupled to the top bezel and the bottom bezel by one touch.

8. The display apparatus as claimed in the claim 5, wherein
   the detachable bezel is screwed into the housing.

9. The display apparatus as claimed in the claim 1, wherein
   the mounting portion comprises a detachable mount or a clip mount.

10. The display apparatus as claimed in the claim 1, wherein
    the side bezel is detachably disposed in the housing.

11. The display apparatus as claimed in the claim 1, further comprising:
    a controller in which software for setting a configuration of the display device is installed,
    wherein the software is configured to accept a screen inversion selection for the display device.

12. The display apparatus according to claim 1, wherein the display device is configured to display an image.

13. A dual monitor setting method for configuring a dual monitor using a first display apparatus and a second display apparatus, each of the first display apparatus and the second display apparatus has a circumference of a front surface of a display device which comprises a top bezel, a bottom bezel, a side bezel, and a black matrix area, the black matrix area of each of the first display apparatus and the second display apparatus is provided at a same side surface, the dual monitor setting method comprising:
    fixing the first display apparatus to a first stand;
    removing the second display apparatus from a second stand;
    rotating the second display apparatus by 180 degrees;
    fixing the second display apparatus, which is rotated by 180 degrees, to the second stand; and
    disposing the second display apparatus so that a second side surface with a second black matrix area of two side surfaces in the second display apparatus is in contact with a first side surface with a first black matrix area of two side surfaces in the first display apparatus.

14. The dual monitor setting method as claimed in claim 13, further comprising:
    inverting a screen of the second display apparatus.

15. The dual monitor setting method as claimed in claim 13, wherein,
    in response to each of the first display apparatus and the second display apparatuses comprising a detachable bezel, the dual monitor setting method further comprising:
    removing the detachable bezel from each of the first display apparatus and the second display apparatus.

16. The dual monitor setting method as claimed in claim 13, wherein a first side surface in the second display apparatus is disposed at an opposite end of the dual monitor from a second side surface in the first display apparatus.

17. A display apparatus comprising:
    a display device which is configured to display an image;
    a housing which is disposed to wrap a top surface, a bottom surface, and one side surface with an integrated bezel to cover a black matrix area of a front surface of the display device;
    a mounting portion which is disposed on a rear surface of the housing; and
    a portion of the black matrix area which is exposed on another side surface opposite to the one side surface of the display device.

18. The display apparatus as claimed in claim 17, further comprising:
    a detachable bezel which is detachably disposed on the one side surface of the display device and opposite to the another side surface of the display device.

19. The display apparatus as claimed in claim 18, wherein the detachable bezel has a same width as a width of a portion of the integrated bezel at the another side surface of the display device.

20. The display apparatus as claimed in claim 17, wherein the mounting portion is disposed equidistant from a top surface and a bottom surface of the display device.

* * * * *